(12) United States Patent
Petersen (10) Patent No.: US 6,600,746 B1
(45) Date of Patent: Jul. 29, 2003

(54) AAL2 FRAMING ON NX64 KBPS E1/T1

(75) Inventor: Lars-Goran Petersen, Tumba (SE)

(73) Assignee: Telefonaktiebolaget LM Ericsson, Stockholm (SE)

( * ) Notice: Subject to any disclaimer, the term of this patent is extended or adjusted under 35 U.S.C. 154(b) by 0 days.

(21) Appl. No.: 09/277,022

(22) Filed: Mar. 30, 1999

(51) Int. Cl.[7] .................................................. H04J 3/00
(52) U.S. Cl. .................. 370/394; 370/395.64; 370/442; 370/522
(58) Field of Search ................................ 370/394, 468, 370/395.64, 347, 442, 470, 471, 474, 476, 477, 506, 510, 522, 524, 537, 395.6, 458

(56) References Cited

U.S. PATENT DOCUMENTS

| | | | |
|---|---|---|---|
| 5,809,023 A | | 9/1998 | Petersen et al. |
| 5,946,309 A | * | 8/1999 | Westberg et al. ........... 370/395 |
| 6,005,871 A | * | 12/1999 | Petersen et al. ........... 370/474 |
| 6,052,386 A | * | 4/2000 | Achilleoudis et al. ...... 370/470 |
| 6,229,821 B1 | * | 5/2001 | Bharucha et al. ........... 370/471 |
| 6,434,154 B1 | * | 8/2002 | Stacey et al. ........... 370/395.64 |
| 6,449,276 B1 | * | 9/2002 | Subbiah et al. ........... 370/395.6 |
| 2001/0012293 A1 | | 8/2001 | Petersen et al. ............ 370/389 |

FOREIGN PATENT DOCUMENTS

| | | |
|---|---|---|
| EP | 0 874 530 A1 | 10/1998 |
| WO | WO 98/32307 | 7/1998 |
| WO | WO 99/29136 | 6/1999 |
| WO | WO 00/48424 | 8/2000 |

OTHER PUBLICATIONS

U.S. patent application Ser. No. 09/247,066, filed Feb. 9, 1999.

* cited by examiner

*Primary Examiner*—Min Jung
(74) *Attorney, Agent, or Firm*—Jenkens & Gilchrist, P.C.

(57) ABSTRACT

A method for mapping a plurality of minicells into a channel structure is disclosed. The channel structure has a plurality of multi-frames with each multi-frame having a plurality of time slots. A start octet is inserted in a first time slot of each multi-frame and the sequence number within the start octet is used to count the number of multi-frames.

10 Claims, 5 Drawing Sheets

AAL2 FRAMING ON NX64 KBPS E1/T1

BACKGROUND

The present invention relates to the transmission of telecommunications data, and more particularly to a novel method of transmitting data on fractional time slots.

Asynchronous Transfer Mode (ATM) is a standard protocol for transmitting asynchronous telecommunications data. This protocol is based on the transmission of data in fixed size data packets known as ATM cells. Each ATM cell exhibits a singular format comprising a 48 octet payload portion and a five octet header portion. ATM is well known.

Unfortunately, ATM does not efficiently transport low bit rate data as the length of a typical low bit rate data packet is significantly less than 48 octets (i.e., the length of an ATM cell payload). Any unused portion of an ATM cell payload is filled with "padding bits". When padding bits are inserted rather than data, bandwidth is wasted. The insertion of padding bits may also result in unacceptable transmission delays, which may be detrimental, especially when the data being transported is highly sensitive to delays, such as voice-type data.

Figure 1:
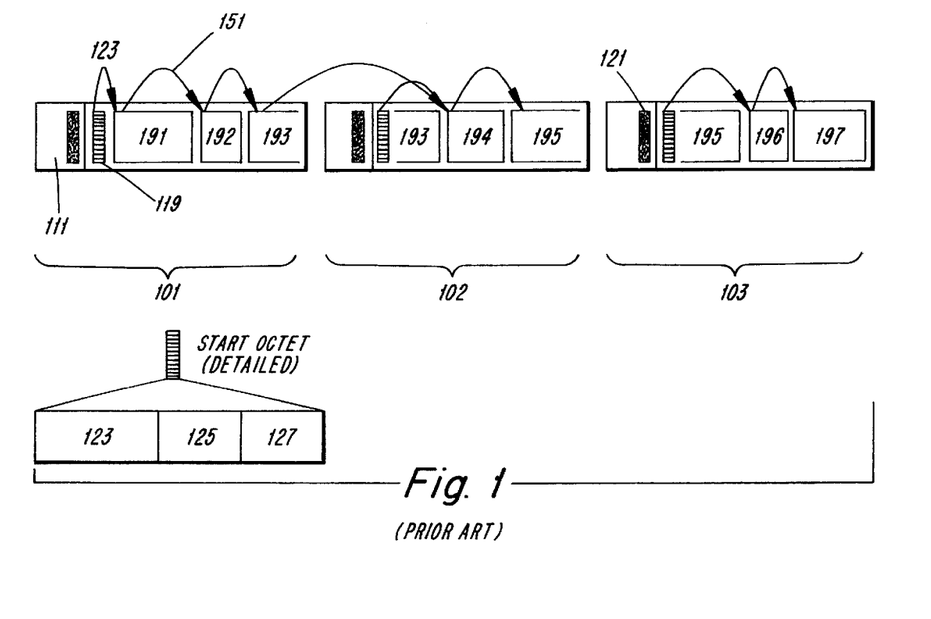
FIG. 1 illustrates a minicell delineation according to I.363.2.

An ATM adaptation layer, known as AAL2, has been developed for the purposes of carrying compressed voice data on ATM and for improving the efficiency of ATM when employed to transport low bit rate data according to Recommendation I.363.2 (hereinafter "I.363.2") which has been approved by the International Telecommunications Union (ITU). Referring to FIG. 1, AAL2 operates by storing low bit rate data in small, variable length data packets called minicells, for example, minicells 191–197, which are sometimes referred to as microcells or short packets. An improvement in bandwidth utilization is achieved by inserting several minicells into the payload of a single ATM cell, such as ATM cell 101. To further improve bandwidth utilization, a minicell, for example minicell 193, may be segmented so that it overlaps two ATM cells 101 and 102 as illustrated.

Under this standard, ATM is needed as an underlying bearer and is defined to be carried on the E1 line in 30 time slots (1-15 and 17-31) and on the T1 line on all 24 time slots. These standards are according to ITU-T Recommendation G.804.

In some cases, using the whole T1 or E1 can be prohibitively expensive. There are an insufficient number of AAL2 connections to utilize the entire bandwidth. In these cases, fractional T1 or E1 may be utilized. Fractional implies that a number of time slots are concatenated to form a channel, e.g., six concatenated time slots comprising 384 Kbps of bandwidth is quite common. The cost per bit of transported information increases as the amount of bandwidth that is utilized decreases. For instance, using a fractional E1 or T1 with ATM and AAL2 results in a bandwidth penalty of about 10%.

FIG. 1 illustrates a conventional AAL2 multiplexing technique with added resilience against loss of delineation in the form of a start octet.

The basic delineation between cells is provided by fixed size ATM cells 101, 102 and 103. The fact that the ATM cells come "back to back" every 53 octets makes it easy to use a receiver state machine that takes this into account. An ATM header 111 of five octets contains a header error control (HEC) field 121 that makes it possible for the receiver to check the integrity of the ATM cell header. Under normal practice, if six ATM cell headers in a sequence are received without any errors, the receiver is considered to be synchronized. Furthermore, due to the 53 octet length, the state machine does not have to leave the sync state at a first error in the ATM cell header. If the error is repeated a predetermined number of times such as, for example, six times, however, it is considered to no longer be in the synchronized state. The same technique is more difficult to apply to the AAL2 demultiplexing since the minicells 191 to 197 can have variable sizes. A length indicator (LI) field 151 provided in the header of each minicell is used to find the start of the next minicell. The entire minicell is protected by a HEC that is similar to the HEC for the ATM cell. This ensures that the integrity of LI can be checked.

In addition, an offset field 123 of six binary coded bits is inserted as a first octet in the payload of every ATM cell. The offset field contains a pointer that makes it possible to find the first minicell, at every new ATM cell, regardless of the LI value 151. The pointer is encapsulated in a start octet 119. The start octet 119 also includes a sequence number bit 125, working as a modulo-2 counter, making it possible to detect if ATM cells have been lost or if there is only a single cell. The start octet 119 is protected by a parity bit 127. If no remaining minicells exist to fill an ATM cell, the remainder of the cell is padded by inserting a zero in every octet to the end of the ATM cell.

Figure 2:
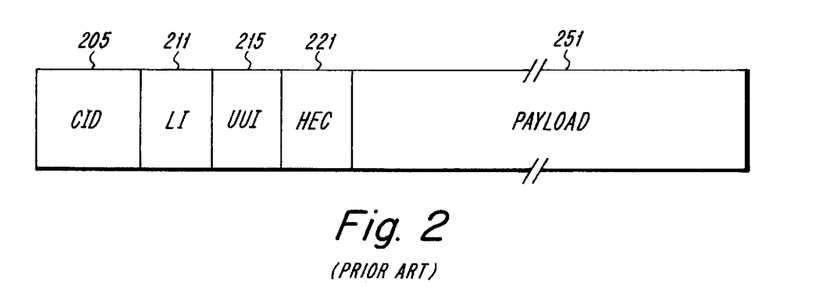
FIG. 2 illustrates a minicell according to I.363.2.

FIG. 2 illustrates a minicell according to I.363.2. This packet is made up of a connection identifier (CID) field 205, a length indicator (LI) field 211, a user to user indication (UUI) field 215, a header error control (HEC) field 221 and a payload field 251.

The CID field 205 is eight bits in length allowing up to 255 connections ranging from $CID_1$, to $CID_{255}$. $CID_0$ is reserved for padding, i.e., if the next octet after the last octet in a previous minicell is zero, then the remainder of the ATM cell is empty. In other words, if the octet where a new minicell is supposed to start is zero, then the remaining octets in the ATM cell are filled with zeroes which is considered to be padding. The receiver, when it detects a zero octet where a new minicell is supposed to start, disregards the remainder of the ATM cell. The LI field 211 is six bits in length and indicates the number of octets in the payload. It ranges from $LI_0$ to $LI_{44}$ which corresponds to payloads of one to 45 octets. The UUI field 215 is also five bits in length and is transparently conveyed from one end user to the other end user. Transparency, in this context, means that the user may or may not be aware of this activity, in this case, the UUI field being conveyed. It may be considered as a field in which the user may place any type of information as long as that information is not placed in the range of $UUI_{26}$ to $UUI_{31}$ which are reserved for segmentation and OAM usage. The HEC field 221, also five bits in length, may be used to verify the integrity of the minicell header.

A copending application, Ser. No. 08/982,425 for "Simultaneous Voice And Data" of Petersen et al., discloses delineation without the support of the underlying ATM connection. The subject matter of this application is hereby incorporated by reference. The described method of delineation, however, is only sufficient for a limited number of active connections and a low bandwidth line, of typically less than 64 Kbps. For larger bandwidths associated with fractional T1/E1, this method of delineation is not resilient as a considerable amount of time is needed to achieve resynchronization. In some instances, this time period may even be indefinite. The use of the disclosed method of delineation is appropriate in a private access line with few users. For public channels with many users expecting a certain quality, however, the time needed to achieve resynchronization is unacceptable. What is needed is another method for achieving re-synchronization in a shorter period of time. This may be accomplished by adapting the AAL2 packets to work directly on fractional time slots.

Figure 3A:
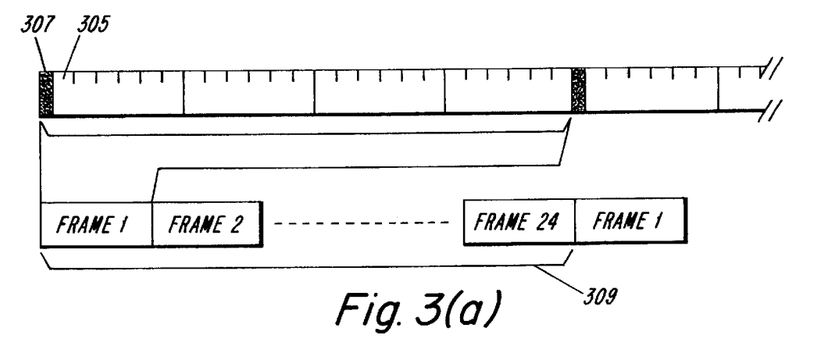
FIG. 3a illustrates a T1 channel structure.
Figure 3B:
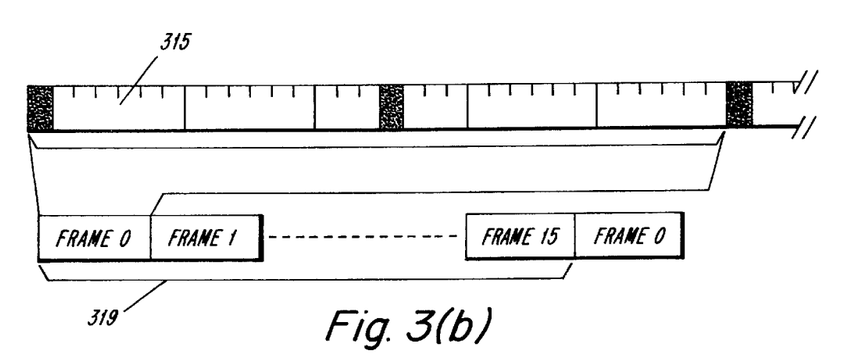
FIG. 3b illustrates an E1 channel structure.

FIGS. 3a and 3b illustrate a conventional synchronous frame with T1 time slot structure of 1544 Kbps and E1 time slot structure of 2048 Kbps respectively. The T1 channel structure is divided into 24 consecutive time slots 305 preceded by a F-bit 307. The time frame is repeated every 125 microseconds. The F-bit 307 is used to indicate, among other things, the start of the frame and multi-frame. The multi-frame structure 309 is repeated after 24 frames.

The E1 channel structure has a similar channel structure based on 32 consecutive time slots 315. $TS_0$ is used to indicate, among others, the start of the frame and multi-frame. The multi-frame structure 319 in this case is repeated after 16 frames. In the E1 channel structure, time slot 16 is predefined for signaling purposes.

In the frame and multi-frame, codes are carried for identifying the start of the frame and the multi-frame and therefore, the position of the individual time slots can also be identified. As a result, the receiver can keep track of the all free time slots in the frame and the multi-frame. A given time slot in each frame belongs to the same connection, thus forming a digital channel of 64 Kbps.

The specifics of the frame, multi-frame and channel structure and allocation can be found in ITU-T Recommendation G.704. In addition, synchronization codes are provided so that the start of the frame and multi-frame can also be determined.

FIGS. 3a and 3b also illustrate the concatenation of six 64 Kbps time slots in a frame to form one channel of 384 Kbps. Four such channels in the T1 and five channels in the E1 are depicted.

The number of time slots that can be concatenated to form one channel is limited to the maximum number of time slots in the frame (with respect to the predefined $TS_0$ and $TS_{15}$ in E1). For an E1 structure, there are 32 time slots numbered $TS_0$ to $TS_{31}$. Of these, 30 time slots, $TS_1$–$TS_{15}$ and $TS_{17}$–$TS_{31}$ may be used for carrying data or control information. As the multi-frame is made up of 16 frames, there are a total of 512 time slots (16 frames each having 32 time slots) and 480 (16 frames with 30 available time slots) of these time slots are available for carrying data or control information.

For the T1 structure, there are 24 time slots all of which are available for carrying data or control information resulting in a total of 576 time slots (24 frames each having 24 time slots). In the T1, an additional bit is added to provide frame and multi-frame synchronization.

The synchronization support in both E1 and T1 enables a receiver to detect the start of the frame and the multi-frame. Consequently, the receiver can keep track of all free time slots in the frame and the multi-frame.

The frames are repeated at a rate of 8 kHz or every 125 micro seconds. The E1 multi-frame, therefore, is repeated after 2 milliseconds (16 frames each repeating every 125 microseconds) and the T1 is repeated after 3 milliseconds (24 frames each repeating every 125 microseconds).

As long as the number of time slots fit within the frame, channels of any bandwidth can be structured in this manner. The channels can even be of varying bandwidth provided that the maximum allowed number of time slots is not exceeded. The concatenated time slots can come in any predetermined order even if consecutive allocation is preferred.

In the illustrations of FIGS. 3a and 3b, any of the 384 Kbps channels can carry minicells. Since 384 Kbps is a very limited bandwidth, a gain could be made by eliminating the ATM cells that are needed to carry the minicells according to I.363.2. The copending application referred to earlier discloses the delineation method based on AAL2 without the ATM layer. If the delineation is lost, the recovery time can be extremely long and may even be indefinite, without the ATM layer.

SUMMARY

What is needed, therefore, is AAL2 working directly on fractional T1/E1 time slots without the need for ATM as an underlying bearer in order to save the 10% bandwidth penalty that is associated with ATM.

According to an exemplary embodiment of the present invention, a method of mapping a plurality of minicells into a channel structure is disclosed. The method comprises the steps of: inserting a start octet in a first of a plurality of time slots corresponding to the channel wherein the plurality of time slots comprise a multi-frame; and counting a number of multi-frames using a sequence number in the start octet wherein a plurality of multi-frames comprise the channel structure.

According to another exemplary embodiment of the present invention, a method of mapping a plurality of minicells into a channel structure having a plurality of multi frames with each of the multi frames having a plurality of time slots is disclosed. This method comprises the steps of: inserting a start octet in a first time slot of the plurality of time slots within each of the multi-frames; counting a number of multi-frames using a sequence number in the start octet; and inserting a connection identifier having a zero value at the end of a transmission of each of the packets.

Exemplary embodiments of the present invention also disclose a method for allocating fractional time slots for carrying data in AAL2 format. The method comprises the steps of: generating, by a channel structure framer, a framing sequence comprising one of a multi-frame signal and a time slot signal; sending the sequence to a time slot counter; generating, by the time slot counter, an address to a location in a time slot table which location includes a channel number and a qualifier; and activating one of a padding generator, a start octet generator and a minicell using the channel number and the qualifier.

Other exemplary embodiments of the present invention disclose a method for providing link synchronization of fractional time slots which have been allocated for carrying AAL2 format data without using ATM as underlying bearer. The method comprises the steps of: generating, by a channel structure framer, one of a multi-frame signal and a time slot signal; transmitting the generated signal to a time slot counter; generating, by the time slot counter, an address to a location in a time slot table which location includes a channel number and a qualifier; and determining, using contents of the address location in the time slot table, a channel to which the time slot belongs.

BRIEF DESCRIPTION OF THE DRAWINGS

The objects and advantages of the invention will be understood by reading the following detailed description in conjunction with the drawings in which.

DETAILED DESCRIPTION

Figure 4:
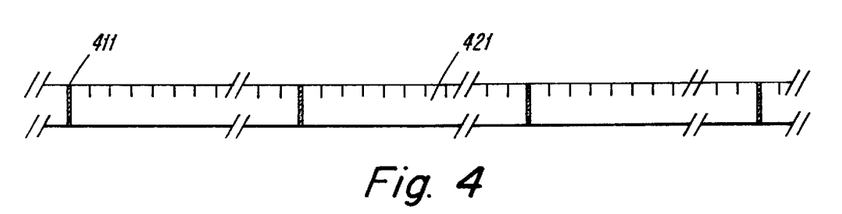
FIG. 4 illustrates a 384 kbps channel in a multi-frame context.

FIG. 4 illustrates the structure of a 384 Kbps channel (comprising six time slots in a TDM frame with each slot being 64 Kbps) carrying minicells mapped into a T1 or E1 multi-frame with a multiframe channel start 411. Since the receiver knows when the multi-frame starts, it can organize the time slots of the frame into channels in order to obtain a greater bandwidth. In the example described, six time slots are used. What is critical is that the transmitter and receiver agree on how the time slots are to be organized into channels. As T1 has 24 frames and E1 has 16 frames, the multi-frame channel 421 has 144 time slots in T1 and 96 time slots in E1. It should be noted that the choice of a channel having six time slots is for exemplary illustration only.

The number of time slots used as an example in this case, 144, is not relevant if the channel structure is repeated in each frame; that is, the same time slot numbers are assigned in each frame. The number of time slots becomes important if the transmitter and the receiver have agreed on another channel structure which is not repeated in every frame. However, in order to achieve a corresponding bandwidth, 144 time slots out of the available 576 must be assigned to the channel.

The non relevant time slots belonging to other channels or bits (i.e., the F-bit for T1) in the T1 or E1 frame structure are omitted. Only the individual octets and the multi-frame start are depicted.

Figure 5:
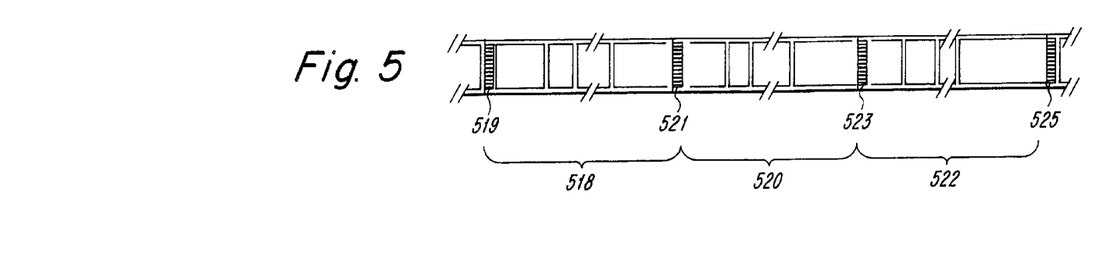
FIG. 5 illustrates a delineation of a minicell mapped directly into a TDM.

FIG. 5 illustrates the direct mapping of the minicells into a channel structured in a T1 or E1 multi-frame according to exemplary embodiments of the present invention. A plurality of length indicators 517 determine the length of each packet. For illustrative purposes, three multi-frames 518, 520 and 522 are depicted. In order to achieve resilience against loss of delineation, start octets 519, 521 and 523 corresponding to multi-frames 518, 520 and 522 respectively, are inserted. A start octet 519 is inserted in the first time slot of the multi-frame 518, a second start octet 521 is inserted in the first time slot of the multi-frame 520 and a third start octet 523 is inserted in the first time slot of the multi-frame 522. A fourth start octet 525 is also depicted but the corresponding multi-frame is not shown. This is similar to the principles described with respect to FIG. 1. The distinction, however, is that the sequence number, in the start octet; now counts multi-frame instead of ATM cells. In this example, the start octet is inserted after every 144 time slots in the T1 structure and after every 96 time slots in the E1 structure.

The channel structure of a time division multiplex (TDM) system is based on the issuance of time slots regardless of the validity of the information being submitted. Accordingly, padding may be inserted at the start of the multi-frame. Furthermore, since the number of time slots in the multi-frame can be quite large, it is preferable to have the ability to stop the padding and continue with a valid minicell anywhere in the multi-frame. This method, as applied to ATM and described in the co-pending application, also applies to a TDM frame.

As minicells are multiplexed in the channel, packets must come back to back. The start of a new packet is determined by the length indicator (LI) in the header of a previous packet. If no more packets are being transmitted (i.e., if this is the last packet), the receiver must be informed as such. Under the AAL2 standard (I.363.2), this is accomplished by sending a CID=0. The receiver now must wait until the next start octet before it realigns. The padding has an octet boundary identified by a CID value of zero. The smallest padding area is one octet although it may extend up to the end of the multi-frame. The padding may be terminated by simply starting with a new minicell which is identified by a non-zero octet. The padding octet can be inserted either when a minicell ends or directly after the start octet.

Another method, described in U.S. Pat. No. 5,809,023 to Petersen et al., the subject matter of which is incorporated herein by reference, may be used to avoid the receiver having to wait for the next start octet. Under this method, a CID value of zero is inserted after a complete packet and another packet may be sent whenever it is ready for transmission. The use of this method according to exemplary embodiments of the present invention avoid excessive delays in transmission of information.

It should be noted that the method is not limited to a channel with a bandwidth of 384 kbps; it could apply to any bandwidth. For example, if the entire T1 is allocated as one channel (i.e., 1544 kbps), 576 time slots (resulting from 24 frames each with 24 time slots) are available in the multi-frame. The start octet could be repeated at that rate or more frequently than every $576^{th}$ time slot if that is not an accepted time interval for resynchronization in case of lost delineation. By using the multi-frame, both sides of the line can agree in advance as to at what positions the start octet is to appear in the multi-frame. The repetition rate should, in practice, be defined by the probability for bit errors on the T1/E1 physical connection and how fast the resynchronization is to be achieved. The higher the probability for errors, the more frequently the start octet has to be repeated.

Figure 6:
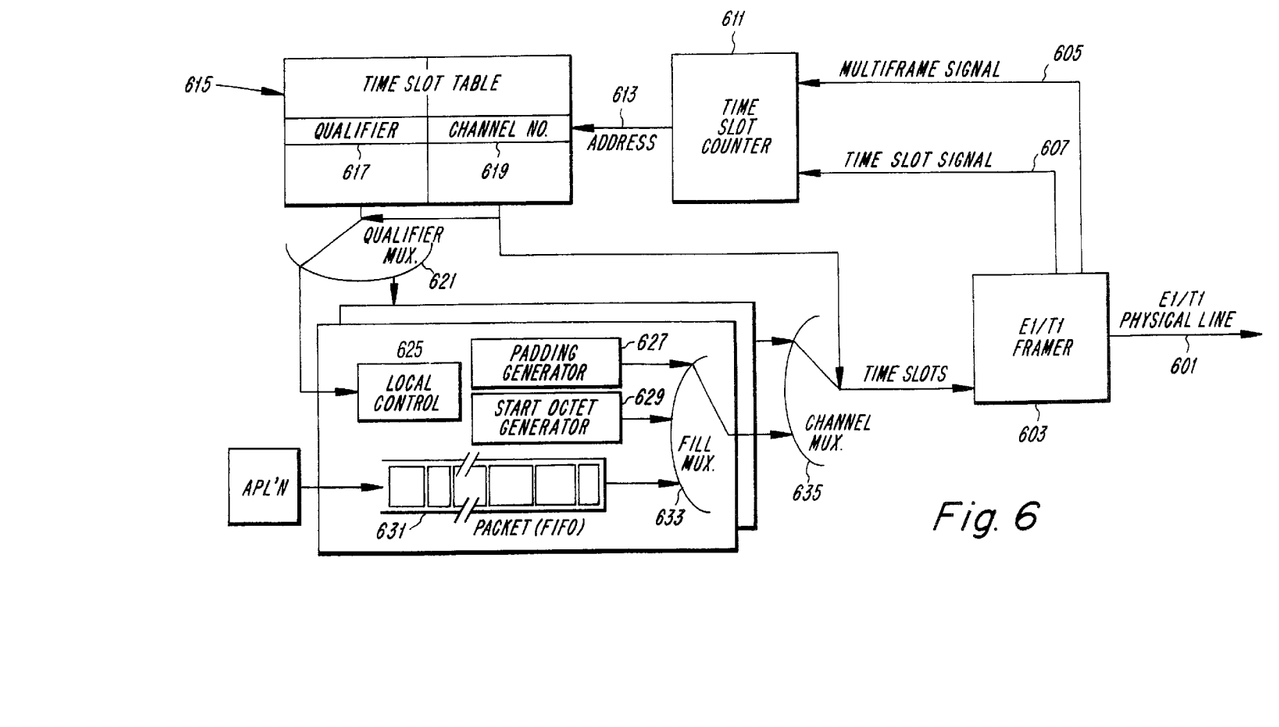
FIG. 6 illustrates an exemplary embodiment of the present invention as implemented in a transmitting end of a communication medium.

FIG. 6 illustrates an exemplary embodiment of the present invention as implemented at the transmitting end of a T1 or E1 connection where fractional time slots may be allocated for carrying data in an AAL2 format. This arrangement facilitates any type of channel allocation within the multi-frame structure or if AAL2 or other type of traffic is assigned to the channel. It is not limited to AAL2 as one channel can carry ordinary time slots and another channel can carry HDLC (high level data link control) frames. ATM cells can also be carried in a channel.

An E1 or T1 framer 603 generates a framing sequence on the physical line 601 according to the ITU-T G.704 standard. The framer 603 also generates multi-frame and time slot signals. A time slot counter 611 receives a multi-frame signal 605 for every 512 time slot signals 607 in E1 structure. The counter 611, if operating in T1 structure, generates a multi-frame signal 605 for every 576 time slot signals 607. These signals are received from the framer 603. Upon receipt of the multi-frame signal 605, the counter 611 is reset to zero indicating a new multi-frame. The counter 611 increments by one for each time slot signal 607. In addition, the counter 611, in response to the time slot signal, generates an address 613 to a time slot table 615.

The time slot table 615 is made up of as many memory locations as time slots in the multi-frame. Each location of the time slot table 615 contains a channel number 619 and a qualifier 617. The channel number indicates the channel to which the time slot belongs. The qualifier indicates the type of information that is carried in the time slot. The channel number controls a qualifier multiplexer 621 which directs the qualifier data to the channel entity assigned to the channel in question (connecting the incoming time slot to the channel that it is mapped to or invoking the channel logic associated with this time slot). A plurality of such channels, 1 to n, are present in which the number n corresponds to the highest channel number. In the illustrated multi-frame structure, n is four for T1 and five for E1. In the illustrated example, only the structure of one such channel is shown.

A channel entity designed for AAL2 according to a preferred embodiment comprises a local control 625, a padding generator 627, a start octet generator 629, a minicell 631 (in a FIFO format) and a fill multiplexer 633. The channel entity is not restricted to carrying minicells. Other channel entities may provide or contain logic for dedicated time slots like $TS_{16}$ which is assigned for signaling. Another channel entity may be used for ATM cell generation and yet another for frame relay.

A number of minicells are inserted into a packet in a FIFO format. The minicells are assembled according to the I.363.2 standard. If a qualifier 617 indicates that a time slot is available for carrying a minicell, the next octet is sent through the fill multiplexer 633 and a channel multiplexer 635 to the framer 603. The minicells belonging to the channel are unloaded (i.e., the packets are framed for transmission) for every new time slot. If the qualifier 617 indicates that the time slot in question is assigned for the start octet, the time slot is released accordingly. Released, in this context, implies that a time slot is issued, i.e., that it is sent out on the E1 or T1. The released/issued time slot, in this case, contains the start octet for the channel assigned to this time slot. The offset field value is given by the remainder of the current minicell that is subject to unloading from the minicell FIFO. If there are no minicells, the offset field is set to zero. If the qualifier indicates that the time slot is assigned minicells and no such packet is present in the packet FIFO, then a padding octet is inserted from the padding generator. The padding generator inserts a zero octet in the time slot. This process of inserting a zero octet is repeated until a minicell appears in the FIFO.

Figure 7:
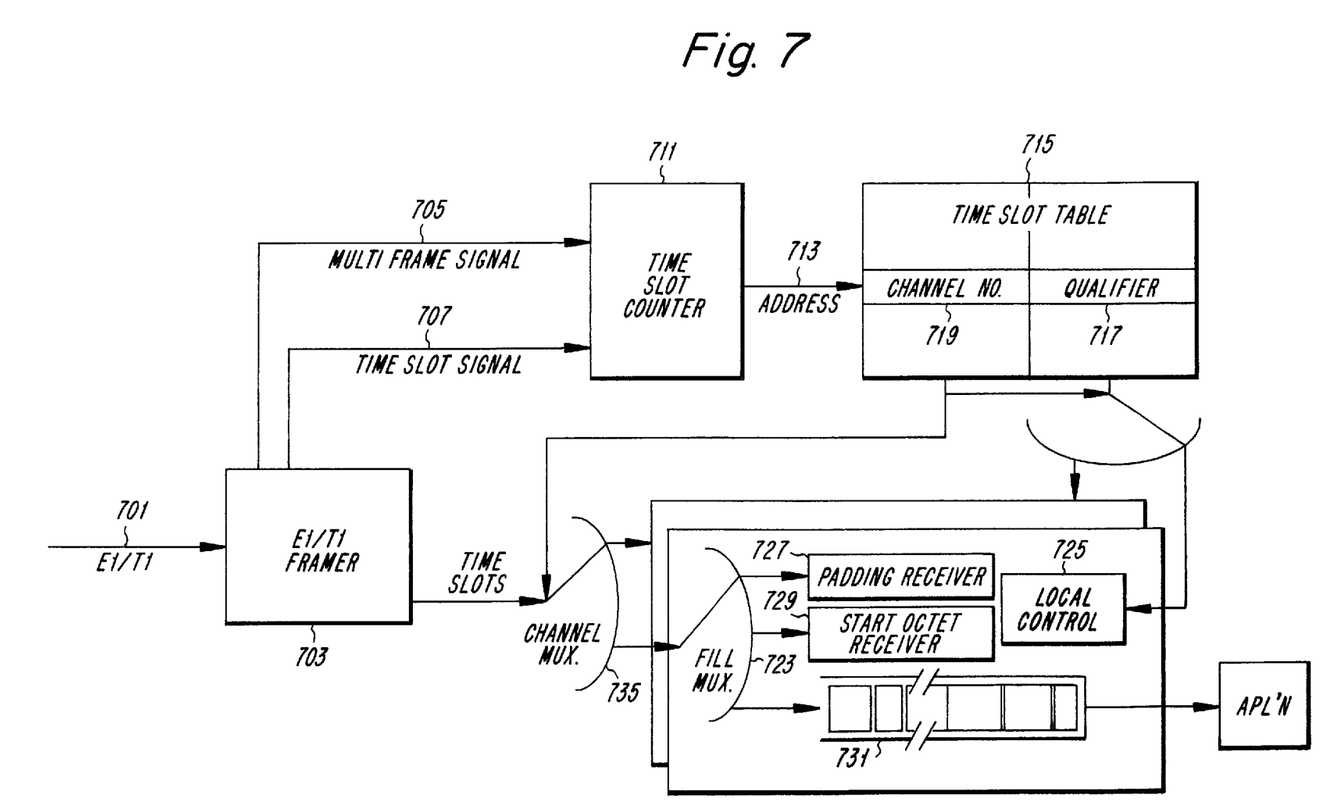
FIG. 7 illustrates an exemplary embodiment of the present invention as implemented in a receiving end of a communication medium.

FIG. 7 illustrates an exemplary embodiment of the present invention as implemented at the receiving end of a T1 or E1 connection. The receiving end is similar to the transmitting end. The framer 703 provides link synchronization, that is, the framer finds the time slot and multi-frame boundaries. The multi-frame signal 705 resets the time slot counter 711. The counter 711 is incremented for each time slot signal received, thus keeping track of every time slot in the multi-frame. The time slot counter addresses a time slot table 715. This table contains information on how the individual time slots in the multi-frame are assigned and to which channels they are assigned. If a time slot is assigned to a channel carrying AAL2, a channel multiplexer 735 is applied to the channel entity in question (connecting the incoming time slot to the channel that it is mapped to or invoking the channel logic associated with this time slot). The qualifier 717 indicates whether the time slot contains a start octet. If a start octet is indicated, the octet is stored in the start octet receiver 729. The offset is then used to synchronize the next minicell.

Figure 8:
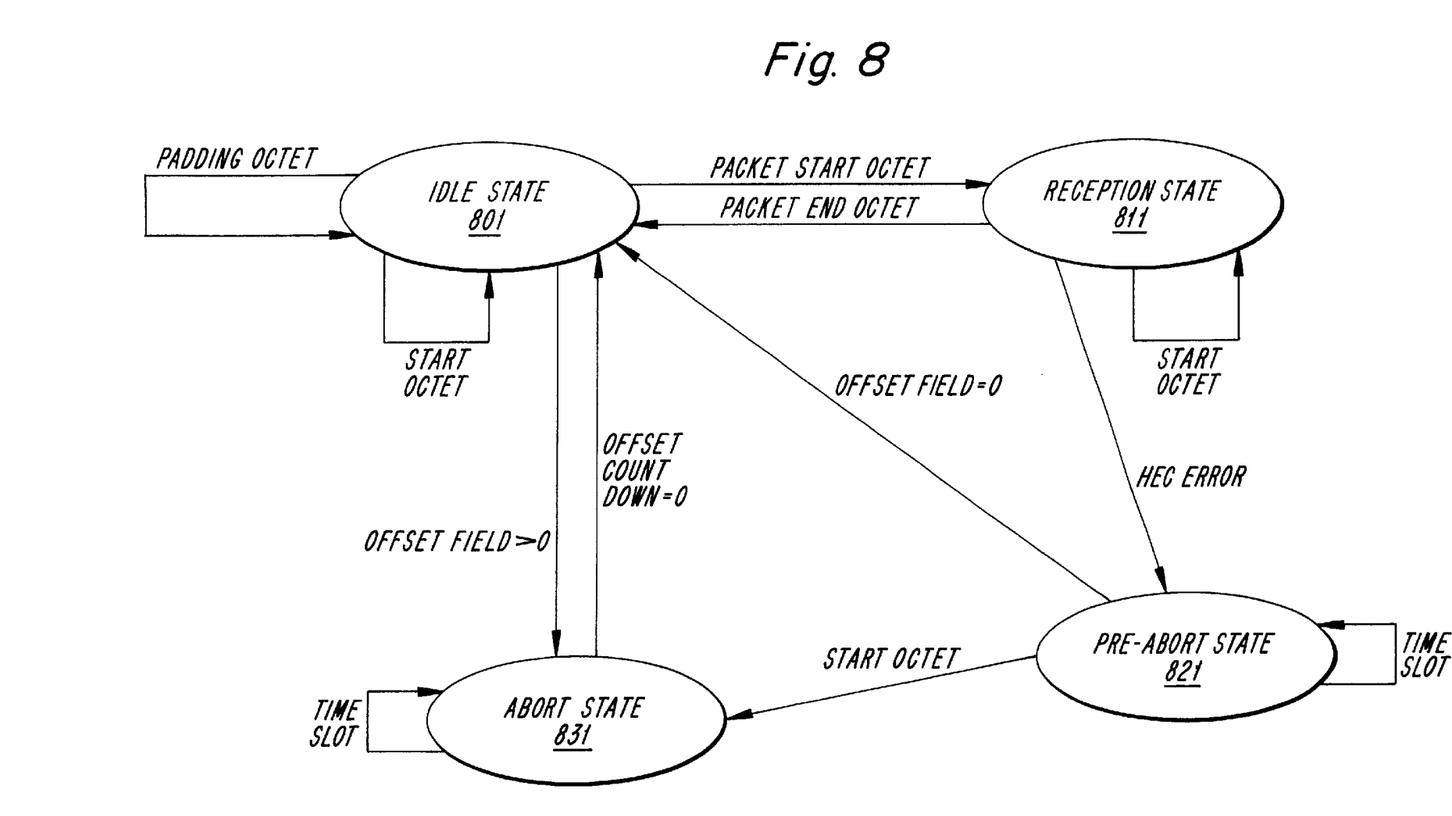
FIG. 8 illustrates a local control state machine for the receiving end of FIG. 7.

FIG. 8 illustrates a local control state machine at the receiving end having four states: idle state 801 which indicates a non-receiving state, reception state 811, pre-abort state 821 or abort state 831. Abort implies that synchronization has been lost and a next start octet is waited on. The goal is to regain synchronization if it is lost.

In the idle state 801, if the incoming time slot is not zero and the qualifier indicates "no start octet", then the octet is put in as a first octet in the minicell and the state is changed to the reception state 811. In the reception state 811, the consecutive time slots are put in a FIFO format. In the second time slot, the length indicator is captured and used to count down incoming time slots until the entire minicell is received. When the last octet in the minicell is received, a change to the idle state 801 takes place.

In the idle state 801, if the qualifier indicates that the incoming time slot contains the start octet, the offset field must be zero. If the offset field is not zero and the parity bit in the start octet is correct, then the abort state 831 is entered and the current offset field value is stored in the offset field counter.

In the reception state 811, if the Header Error Control (HEC) in the third octet of a minicell is not correct, then the receiving of the minicell is terminated and the pre-abort 821 state is entered. The portion of the minicell that is already placed in the FIFO is withdrawn.

In the pre-abort state 821, the incoming time slots not carrying the start octet are discarded and the state remains constant. When the start octet is indicated and it is correct and not zero, the offset field is loaded into the offset field counter and the abort state 831 is entered. If the offset field is zero with correct parity, then the idle state 801 is entered directly. If the parity is not correct, the pre-abort state 821 remains until a correct start octet is received.

While in the abort state 831, the offset field counter is counted down one step for every new time slot assigned to the channel. When counted down to zero, the idle state 801 is entered.

The present invention has been described with reference to several exemplary embodiments. However, it will be readily apparent to those skilled in the art that it is possible to embody the invention in specific forms other than those of the exemplary embodiments described above. This may be done without departing from the spirit of the invention. These exemplary embodiments are merely illustrative and should not be considered restrictive in any way. The scope of the invention is given by the appended claims, rather than the preceding description, and all variations and equivalents which fall within the range of the claims are intended to be embraced therein.

What is claimed is:

1. A method of mapping a plurality of minicells into a channel structure, said method comprising the steps of:

inserting a start octet in a first time slot of a plurality of time slots corresponding to said channel structure; wherein a multi-frame is comprised of said plurality of time slots;

counting a number of multi-frames using a sequence number in the start octet; and wherein the channel structure is comprised of a plurality of multi-frames.

2. The method according to claim 1, wherein said channel structure is a T1 channel structure.

3. The method according to claim 2, wherein at least one start octet is inserted within every 144 time slots.

4. The method according to claim 1, wherein said channel structure is a E1 channel structure.

5. The method according to claim 4, wherein at least one start octet is inserted within every 96 time slots.

6. A method of mapping a plurality of minicells into a channel structure having a plurality of multi frames, each of said multi frames having a plurality of time slots, said method comprising the steps of:

inserting a start octet in a first time slot of said plurality of time slots within each of said plurality of multi-frames;

counting a number of multi-frames using a sequence number in the start octet; and inserting a connection identifier having a zero value at the end of a transmission of each of said minicells.

7. The method according to claim 6, wherein said channel structure is a T1 channel structure.

8. The method according to claim 7, wherein at least one start octet is inserted within every 144 time slots.

9. The method according to claim 6, wherein said channel structure is a E1 channel structure.

10. The method according to claim 9, wherein at least one start octet is inserted within every 96 time slots.

* * * * *